(12) United States Patent
Lipert

(10) Patent No.: US 7,600,741 B2
(45) Date of Patent: Oct. 13, 2009

(54) GAS BUBBLE MIXER

(76) Inventor: Piotr Lipert, 163 Roger-Pilon Street, Dollard-des-Ormeaux, Quebec (CA) H9B 1A9

( * ) Notice: Subject to any disclaimer, the term of this patent is extended or adjusted under 35 U.S.C. 154(b) by 561 days.

(21) Appl. No.: 11/348,853

(22) Filed: Feb. 7, 2006

(65) Prior Publication Data

US 2007/0182033 A1    Aug. 9, 2007

(51) Int. Cl.
*B01F 3/04* (2006.01)
(52) U.S. Cl. .......................... 261/77; 261/123
(58) Field of Classification Search .................. 261/77, 261/123, 126
See application file for complete search history.

(56) References Cited

U.S. PATENT DOCUMENTS

| | | | |
|---|---|---|---|
| 2,967,399 A | 1/1961 | Laurie | |
| 3,148,509 A | 9/1964 | Laurie | |
| 3,246,761 A | 4/1966 | Bryan et al. | |
| 4,169,873 A | 10/1979 | Lipert | |
| 4,187,263 A | 2/1980 | Lipert | |
| 4,193,869 A | 3/1980 | Brucker et al. | |
| 4,210,613 A * | 7/1980 | Webb ..................... 261/120 | |
| 4,231,863 A | 11/1980 | Sutphin | |
| 4,293,506 A | 10/1981 | Lipert | |
| 4,356,131 A | 10/1982 | Lipert | |
| 4,436,675 A | 3/1984 | Hisao et al. | |
| 4,439,316 A * | 3/1984 | Kozima et al. .............. 210/150 | |
| 4,569,757 A | 2/1986 | Moore | |
| 4,569,804 A | 2/1986 | Murphy | |
| 4,702,830 A | 10/1987 | Makino et al. | |
| 4,707,308 A | 11/1987 | Ryall | |
| 4,710,292 A | 12/1987 | DeVos | |
| 4,752,421 A | 6/1988 | Makino | |
| 4,789,503 A | 12/1988 | Murphy | |
| 4,828,696 A | 5/1989 | Makino et al. | |
| 4,879,046 A * | 11/1989 | Kojima ..................... 210/747 | |
| 4,906,363 A | 3/1990 | Makino et al. | |
| 4,911,838 A | 3/1990 | Tanaka | |
| 5,133,907 A | 7/1992 | Weber et al. | |
| 5,227,056 A * | 7/1993 | Makino ................. 210/170.06 | |
| 5,256,309 A * | 10/1993 | Makino ..................... 210/721 | |
| 5,466,369 A | 11/1995 | Hess et al. | |
| 5,605,653 A | 2/1997 | DeVos | |
| 5,755,976 A | 5/1998 | Kortmann | |
| 6,237,898 B1 | 5/2001 | Lafont | |
| 6,406,624 B1 | 6/2002 | DeVos | |

FOREIGN PATENT DOCUMENTS

| | | |
|---|---|---|
| DE | 2502660 | 8/1975 |
| EP | 0 039 204 | 11/1981 |

* cited by examiner

*Primary Examiner*—Scott Bushey
(74) *Attorney, Agent, or Firm*—RatnerPrestia

(57) ABSTRACT

A gas bubble generator suitable for use in anaerobic digestion systems for treating waste sludge. The gas bubble generator is submerged within a large body of liquid and is attached to a stackpipe. The gas bubble generator includes a first gas accumulation chamber, a second gas accumulation chamber and a stand pipe that has a gas outlet through which gas exits the bubble generator. The gas bubble generator further includes a continuous passageway between the second gas accumulation chamber and the stand pipe through which gas can travel from the first and second gas accumulation chambers to the gas outlet. The continuous passageway is absent a hydraulic braking orifice.

36 Claims, 11 Drawing Sheets

GAS BUBBLE MIXER

FIELD OF THE INVENTION

The present invention relates to the field of liquid circulation devices, and more specifically to gas piston-bubble mixers (hereafter referred to as "gas bubble mixers") that promote liquid circulation and anaerobic digestion in bodies of waste sludge.

BACKGROUND OF THE INVENTION

Gas bubble mixers for improving the performance of anaerobic digestion of waste sludge, are known in the art. Such gas bubble mixers generally comprise two main components; namely, a large stack pipe and a gas piston-bubble generator (hereafter referred to as a "gas bubble generator") that is located adjacent to the stack pipe.

In use, both the stackpipe and the bubble generator are completely submerged within the body of waste sludge, with the stackpipe positioned in a vertical configuration. The stackpipe has a liquid intake opening at its base and a gas/liquid discharge opening at its upper end. The stackpipe further includes a gas bubble inlet at its lower end that is in communication with the gas bubble generator. The gas bubble generator is thus operative for producing gas bubbles that are supplied to the stackpipe through the gas bubble inlet.

Gas bubble generators typically include gas accumulation chambers in which gas is received from a gas supply line, and a stand pipe through which the accumulated gas exits the bubble generator into the stackpipe. Once a sufficient amount of gas has accumulated within the gas accumulation chambers, the gas is naturally siphoned out of the bubble generator through the stand pipe and into the stackpipe, thereby forming a large gas bubble within the stackpipe. As this bubble rises, it creates a piston-like effect that both pushes and pulls the liquid containing dissolved and suspended solids upwards through the stackpipe. By effecting this simultaneous two-phase flow, the gas bubbles that travel through the stack pipe produce a strong pumping action, which continually mixes the body of liquid. This continuous mixing aids in the anaerobic digestion process of transforming organic solids into a gaseous state by maintaining a uniformity of the incoming solids within the mixture, and by helping to maintain the body of liquid at a constant temperature.

Although gas bubble mixers of the type outlined above are known in the art, most gas bubble mixers that are currently in use today contain many deficiencies that render them inefficient and difficult to work with.

One of the major deficiencies with existing gas bubble mixers is that they often get clogged after start-up, and are then very difficult and inconvenient to clean. Keeping in mind that most gas bubble mixers are placed in large tanks of waste sludge that contain organic solids and a smaller portion of non-biodegradable solids such as grit, hair, paper, plastics, small stones, sand, and other difficult-to-degrade debris, it is not surprising that after a period of use this debris gets inside the gas bubble mixers and causes them to clog. Obviously, when such clogging happens, the bubble generators need to be cleaned out and unclogged so that they can return to normal function. While some bubble generators include flushing passages that are able to flush out and unclog some of their chambers, there are many parts of the bubble generators that can only be cleaned out by emptying the tank of the waste sludge, and then manually cleaning out the bubble generators. This cleaning process causes significant expense due to the effort required to empty the tank, as well as the significant down-time caused by this cleaning, during which time the anaerobic digestion system is not in use.

A further deficiency with existing bubble generators lies in their inefficient bubble generation. Due to the size and internal configuration of many bubble generators, they create bubbles that are either too large or too small to effectively create an efficient and effective pumping action through the stackpipe. Producing bubbles that are too large renders the system inefficient, since it increases the energy costs associated with the operation of the bubble mixers, and producing bubbles that are too small yields inadequate pumping action.

A further deficiency with existing bubble mixers lies in their poorly designed hydraulic braking orifices. Many existing bubble mixers are ineffective at producing adequate gas bubbles due to poor bubble frequency control. If the frequency of bubble emission is not properly calibrated, the accumulated gas volume within the bubble generator will either break into many smaller bubbles on entry into the stackpipe or it will generate an inefficient, fluctuating pumping action. Both scenarios cause an ineffective pumping action and poor liquid circulation through the stackpipe. Furthermore, hydraulic braking orifices that are positioned between the second gas accumulation chamber and the stand pipe often create incomplete flushing of the gas contained within the gas accumulation chambers. This incomplete flushing can lead to debris deposition and build-up inside the gas accumulation chambers and the stand pipe, which will cause clogging to occur more rapidly.

A still further deficiency with many gas bubble mixers is that the stackpipe is supported with supporting legs that surround the stackpipe's liquid intake opening. The congestion caused by these supports restricts liquid flow into the stackpipe. This in turn can prevent the gas bubble mixers from effectively and uniformly mixing the liquid/waste sludge contained within the tank.

In light of the above, it can be seen that there is a need in the industry for a gas bubble mixer that integrates an improved gas bubble generator that alleviates, at least in part, the deficiencies of the prior art, and improves on the overall efficiency of the gas bubble mixer.

SUMMARY OF THE INVENTION

In accordance with a first broad aspect, the present invention provides a gas bubble generator suitable for being submerged within a body of liquid and for being positioned adjacent to the stack pipe. The gas bubble generator comprises a first gas accumulation chamber, a second gas accumulation chamber and a stand pipe. The stand pipe has a lower end in communication with the second gas accumulation chamber and an upper end having an exit through which gas exits the bubble generator. The gas bubble generator further comprises a continuous passageway between the second gas accumulation chamber and the stand pipe through which gas can travel from the first and second gas accumulation chambers to the gas outlet. The continuous passageway is absent a hydraulic braking orifice. The bubble generator further comprises a hydraulic braking opening in proximity to the upper end of the stand pipe.

In accordance with a second broad aspect, the present invention provides a gas bubble generator suitable for being attached to a stackpipe, or its supports, and submerged within a body of liquid. The gas bubble generator comprising a first gas accumulation chamber, a second gas accumulation chamber, a stand pipe, a gas inlet and a flushing inlet. The first gas accumulation chamber and the second gas accumulation chamber are separated by a first wall and the second gas accumulation chamber and the stand pipe are separated by a second wall. The flushing inlet is positioned above one or both of the first gas accumulation chamber and the stand pipe, and is operative for directing flushing fluid into the second gas accumulation chamber, stand pipe, and stack pipe, In accordance with another broad aspect, the present invention provides a gas bubble generator suitable for being submerged within a body of liquid and for being positioned adjacent a stackpipe. The stackpipe has an upper discharge opening, a lower inlet opening and a tubular passage through which gas bubbles can travel. The gas bubble generator comprises a first gas accumulation chamber, a second gas accumulation chamber and a stand pipe. The stand pipe comprises a gas outlet in communication with the lower, side inlet opening of the stackpipe for releasing gas bubbles into the tubular passage and a back wall. At least a portion of the back wall being positioned within the tubular passage of the stackpipe.

In accordance with another broad aspect, the present invention provides a gas bubble generator suitable for being submerged within a body of liquid and for being positioned adjacent to a stackpipe. The gas bubble generator comprises a housing having a top wall and at least one side wall and a hydraulic braking hood. The housing contains a first gas accumulation chamber, a second gas accumulation chamber and a stand pipe that comprises a gas outlet through which gas exits the gas bubble generator. The hydraulic braking hood is positioned above the gas outlet and comprises a front wall connected between the stackpipe and the top wall of the housing, two side edges and at least one bottom portion, wherein at least one of the side edges and the bottom portion are open to the body of liquid.

In accordance with another broad aspect, the present invention provides a gas bubble mixer suitable for use in a tank containing a body of liquid. The gas bubble mixer comprises a stackpipe suitable for being submerged in the body of liquid and a gas bubble generator. The stackpipe comprises an upper section having an upper discharge opening, a lower section having a bubble inlet opening. The gas bubble generator is attached to the lower section of the stackpipe and is operative for supplying gas bubbles to the bubble inlet opening. The gas bubble mixer further comprises at least three legs for mounting the stackpipe to the tank. The at least three legs are attached to said stackpipe.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
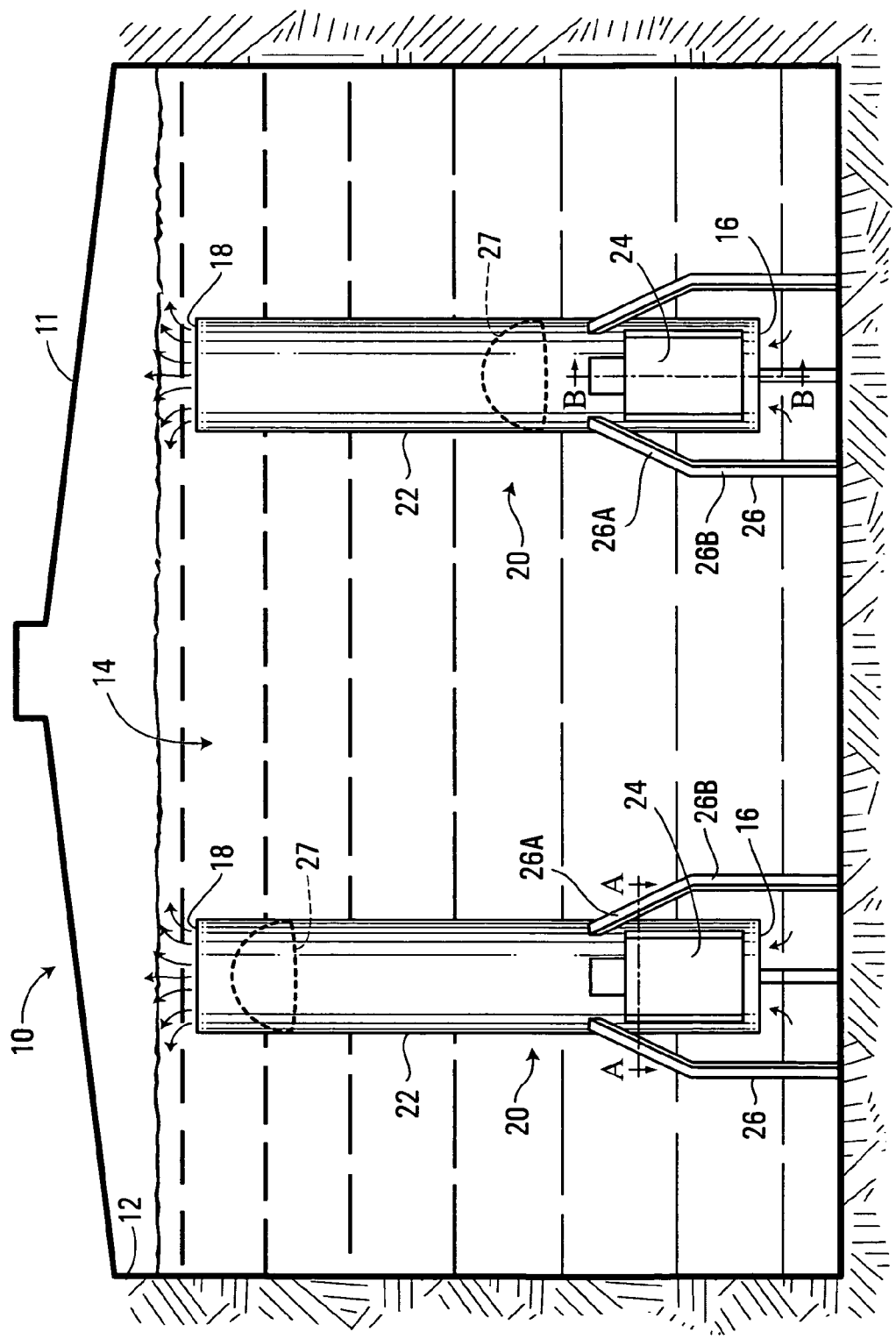
FIG. 1 shows a schematic diagram of an anaerobic digestion system comprising a tank containing a body of liquid and two gas bubble mixers that are in accordance with a non-limiting example of implementation of the present invention.

Shown in FIG. 1 is an anaerobic digestion system 10 for treating waste sludge containing bio-solids. The system 10 includes a large tank 12 having a cover 11, and a pair of gas bubble mixers 20 for treating a body of liquid 14 (which will be referred to interchangeably as waste sludge throughout this description) contained in the tank 12. Although only two gas bubble mixers 20 are shown in FIG. 1, it should be appreciated that any number of gas bubble mixers 20 can be included within the anaerobic digestion system 10 without departing from the spirit of the invention. A person of skill in the art would be able to establish the appropriate number of gas bubble mixers 20 to include within the tank 12 depending on certain parameters such as the volume of the tank, the rate of mixing desired, etc. . . .

Anaerobic digestion systems of the type shown in FIG. 1 are used to decompose industrial and municipal waste sludge into substances that can safely re-enter the environment. The body of liquid 14 (i.e. the waste sludge) generally contains in the order of 92-98% waste liquid and 2-8% waste solids. The gas bubble mixers 20 are operative for continually circulating the body of liquid 14 in the tank 12, which helps to keep the waste sludge at a uniform concentration of suspended solids and at a constant temperature throughout the body of liquid 14. Both of these factors are important in improving process performance in anaerobic digestion systems.

As shown in FIG. 1, the gas bubble mixers 20 include a stackpipe 22 and a gas bubble generator 24. Both the stackpipe 22 and the gas bubble generator 24 are submerged within the body of liquid 14, such that the stackpipe 22 is positioned in a vertical orientation. The stackpipe 22 includes a generally tubular body with a liquid intake opening 16 at its bottom end, and a gas/liquid discharge opening 18 at its upper end. The stackpipe 22 further includes an opening (not shown in FIG. 1) for receiving gas bubbles generated from the gas bubble generator 24. In the embodiment shown in FIG. 1, the stackpipe 22 is mounted to the base of the tank via three legs 26, which will be described in more detail further on in the description.

Figure 2:
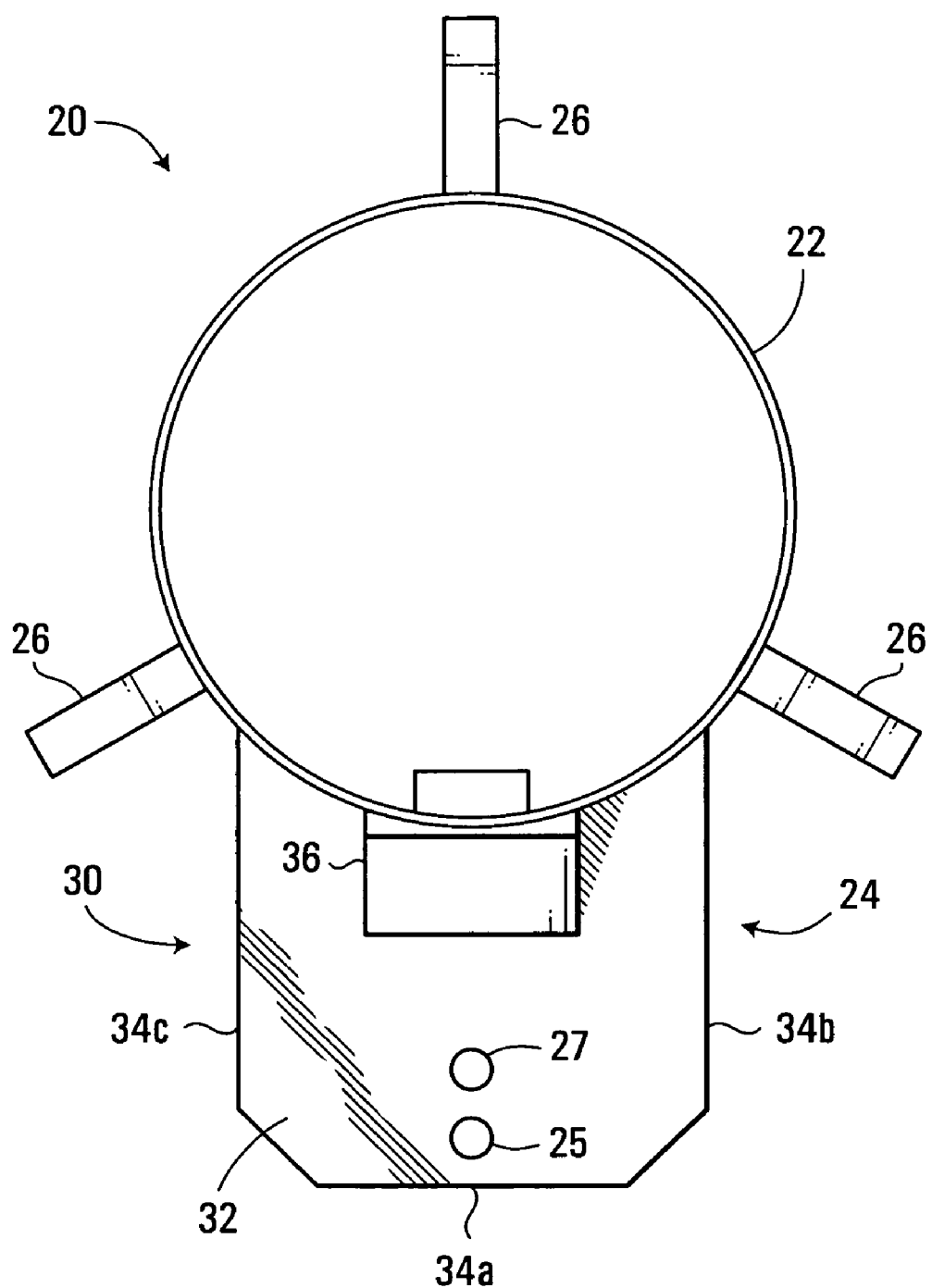
FIG. 2 shows a top plan view of a stackpipe and gas bubble generator in accordance with a non-limiting embodiment of the present invention.

Although the stackpipe 22 shown in FIG. 2 has a generally cylindrical shape, it should be appreciated that a stackpipe 22 having other shapes, such as an oval, square or octagonal cross section, can also be used without departing from the spirit of the invention.

In order to keep the body of liquid 14 circulating within the tank 12, the gas bubble generators 24 create gas bubbles 27 which are released into openings in their respective stackpipes 22. Once released, the gas bubbles 27 travel up through the stackpipe 22 thereby pushing and pulling all liquid contained in the stackpipe upwards. This liquid exits out of gas/liquid discharge opening 18. As the gas bubble 27 moves up through the stackpipe 22, more liquid from the tank 12 is pulled into the lower end of the stackpipe 22 through the liquid intake opening 16. In this manner, the bubbles form a "piston-type" pumping action for pumping the liquid contained in the tank 12 through the stackpipe 22.

A non-limiting embodiment of a gas bubble generator 24 in accordance with the present invention will now be described in more detail with reference to FIGS. 2-5.

Shown in FIG. 2 is a top plan view of the stackpipe 22, the gas bubble generator 24 and the three legs 26 of a gas bubble mixer 20. The gas bubble generator 24 includes a housing 30, which in the non-limiting embodiment shown, is of a generally rectangular shape. The housing 30 includes a top wall 32 and three side walls 34a, 34b and 34c. The gas bubble generator 24 further includes a hydraulic braking hood 36 positioned above the housing 30, which will be described in more detail further on in the description. Extending into the top wall 32 of the housing 30 is a gas supply line 25 and a flushing line 27.

Figure 3:
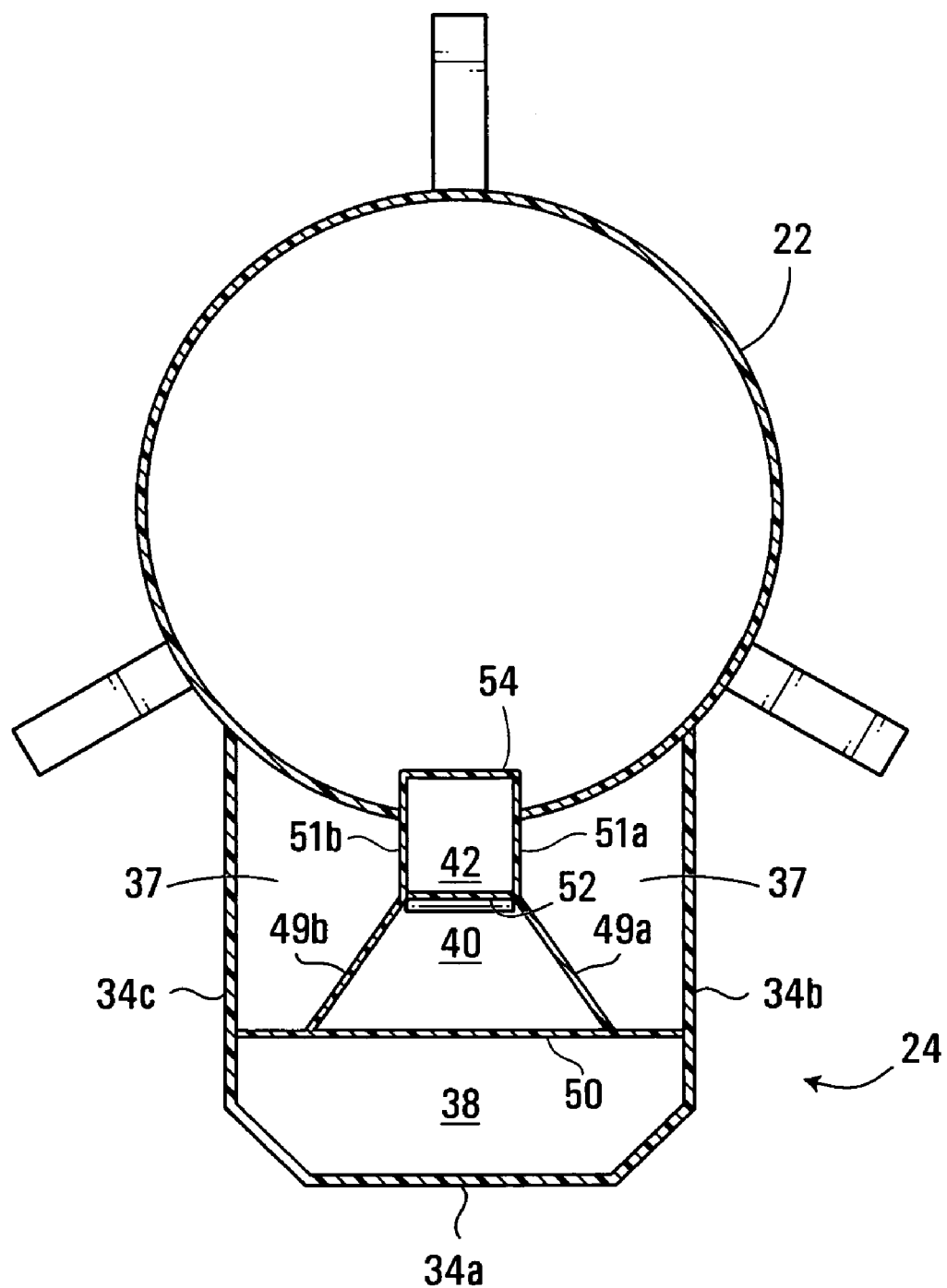
FIG. 3 shows a top cross sectional view of the gas bubble generator of FIG. 2.
Figure 4:
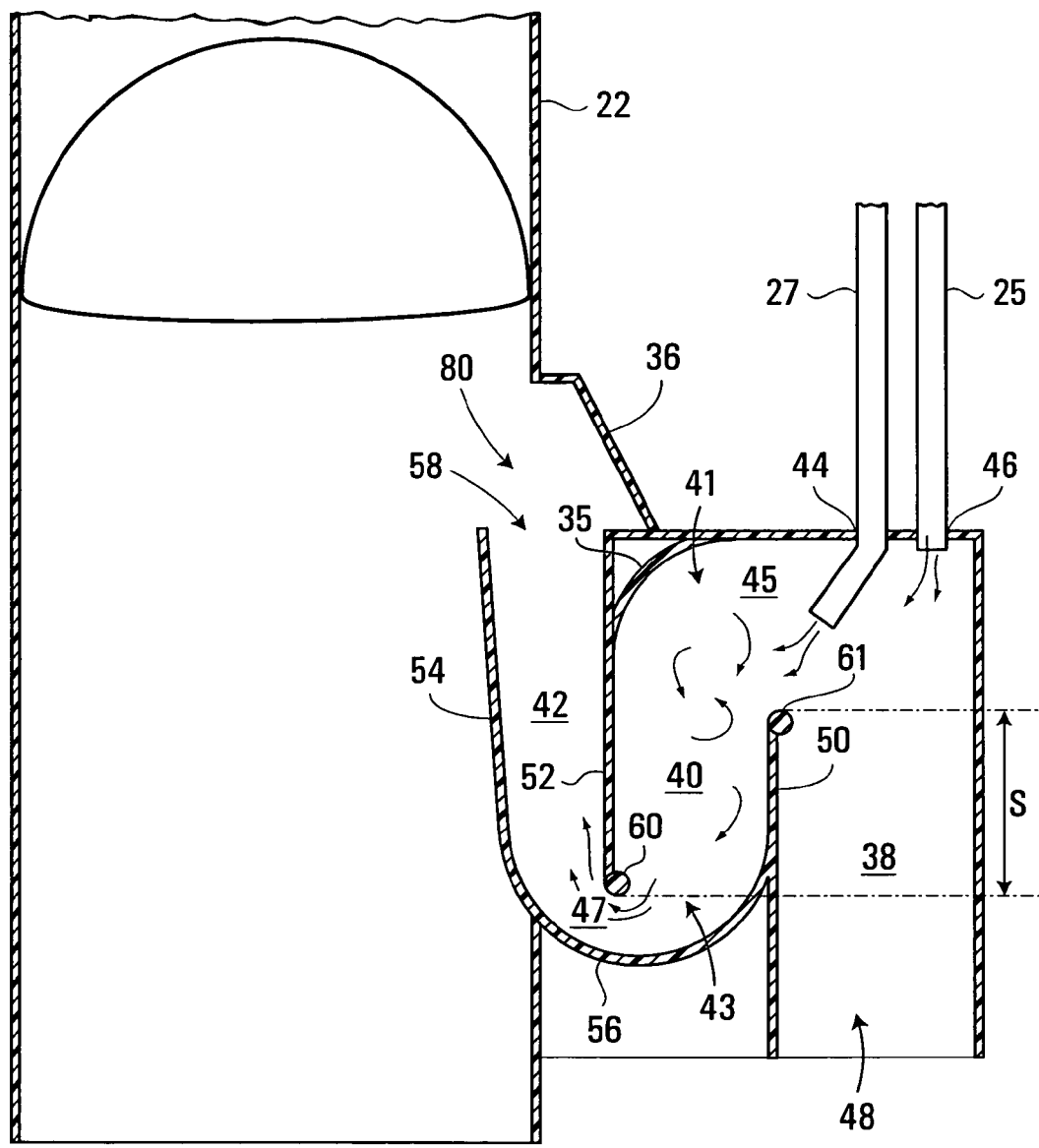
FIG. 4 shows a side cross sectional view of the gas bubble generator of FIGS. 2 and 3.

The interior chambers of the gas bubble generator 24 are shown in more detail in FIGS. 3 and 4, wherein FIG. 3 shows a cross sectional view of the gas bubble generator 24 as taken along line A-A of FIG. 1, and FIG. 4 shows a cross sectional view of the gas bubble generator 24 as taken along line B-B of FIG. 1. As shown in these two Figures, contained within the housing 30 are three interior chambers; namely a first gas accumulation chamber 38, a second gas accumulation chamber 40 and a stand pipe 42. Positioned on either side of the second gas accumulation chamber 40 and the stand pipe 42 are empty chambers 37 that form no part of the functionality of the gas bubble generator 24 and can be open to the body of liquid 14 from the top and/or bottom. These empty chambers 37 exist simply as a result of the shape of the housing 30. As will be shown further on in the specification, gas bubble generators that do not have a substantially rectangular housing 30 do not include these empty chambers 37.

Separating the first gas accumulation chamber 38 from the second gas accumulation chamber 40 is a first wall 50, and separating the second gas accumulation chamber 40 from the stand pipe 42 is a second wall 52. As best shown in FIG. 3, the second gas accumulation chamber 40 is bounded by the first wall 50, the second wall 52 and two side walls 49a and 49b that taper inwards from the first wall 50 to the second wall 52. As such, the cross sectional area of the first gas accumulation chamber 38 is larger than the cross sectional area of the second gas accumulation chamber 40. Likewise, the cross sectional area of the second gas accumulation chamber 40 is larger than the cross sectional area of the stand pipe 42. In accordance with a non-limiting example of implementation, the first gas accumulation chamber 38 has a width of 20" and a depth of 10", the second accumulation chamber 40 has a with of 16" (at its widest point) and a depth of 8" and the standpipe has a width of 6" and a depth of 6".

The dimensions of the three chambers 38, 40 and 42, as well as the length of the vertical stroke "s", which is defined between the edge 61 of the first wall 50 and the edge 60 of the second wall 52, and the physical arrangement of the hood 36 and its hydraulic openings (to be described further on), control the size of the gas bubbles that are generated by the gas bubble generator 24.

In the non-limiting embodiment shown in FIGS. 3 and 4, a portion of the stand pipe 42 is positioned within the tubular passage of the stackpipe 22. The stand pipe 42 is defined by wall 52, two side walls 51a and 51b and a back wall 54. The two side walls 51a and 51b intersect the stackpipe 22, such that the back wall 54 is positioned within the tubular passage of the stackpipe 22. By positioning a portion of the standpipe 42, within the tubular passage of the stackpipe 22, the injection of the gas piston bubbles into the stackpipe 22 are more centralized. This reduces piston-bubble slippage and thus renders the pumping action more efficient. Furthermore, by positioning a portion of the stand pipe 42 within the stackpipe 22, the stackpipe 22 can have a greater diameter than if the stand pipe 42 was positioned completely outside of the stackpipe 22.

As shown in FIG. 4, the back wall 54 of the stand pipe 42 is positioned at an angle in relation to a longitudinal axis of the stackpipe 22. In accordance with a non-limiting example, the back wall 54 of the stand pipe can be positioned at an inclination of between 5°-10° in relation to the longitudinal axis of the stackpipe 22. However, it should be understood that the back wall 54 of the stand pipe 42 can be positioned at any angle in relation to the stackpipe 22 without departing from the spirit of the invention. The angled stand pipe 42 provides for smoother transition of back wall 52 into stack pipe 22, which reduces sludge flow friction in stack pipe 22.

Referring now to FIG. 4, the second gas accumulation chamber 40 includes an upper end 41 and a lower end 43, wherein the upper end 41 includes a passageway 45 that is in communication with the first gas accumulation chamber 38 and the lower end 43 includes a continuous passageway 47 that is in communication with the stand pipe 42. In accordance with a non-limiting embodiment of the present invention, the upper end 41 of the second gas accumulation chamber 40 can include a curved wall section 35 for facilitating the passage of gas and liquid flow through passageway 45. The passageway 47 between the second gas accumulation chamber 40 and the stand pipe 42 is formed between the second wall 52 and a curved wall 56 that extends from the first wall 50 to the back wall 54 of the stand pipe.

The passageway 47 that extends between the second gas accumulation chamber 40 and the stand pipe 42 is continuous and absent of any hydraulic braking orifices. For the purposes of the present application, the term continuous means without any obstructions or orifices that could affect the flow of gas and/or liquid through the passageway 47. The continuous passageway 47 is therefore a smooth passageway that promotes the easy passage of gas from the second gas accumulation chamber 40 to the stand pipe 42.

Figure 5:
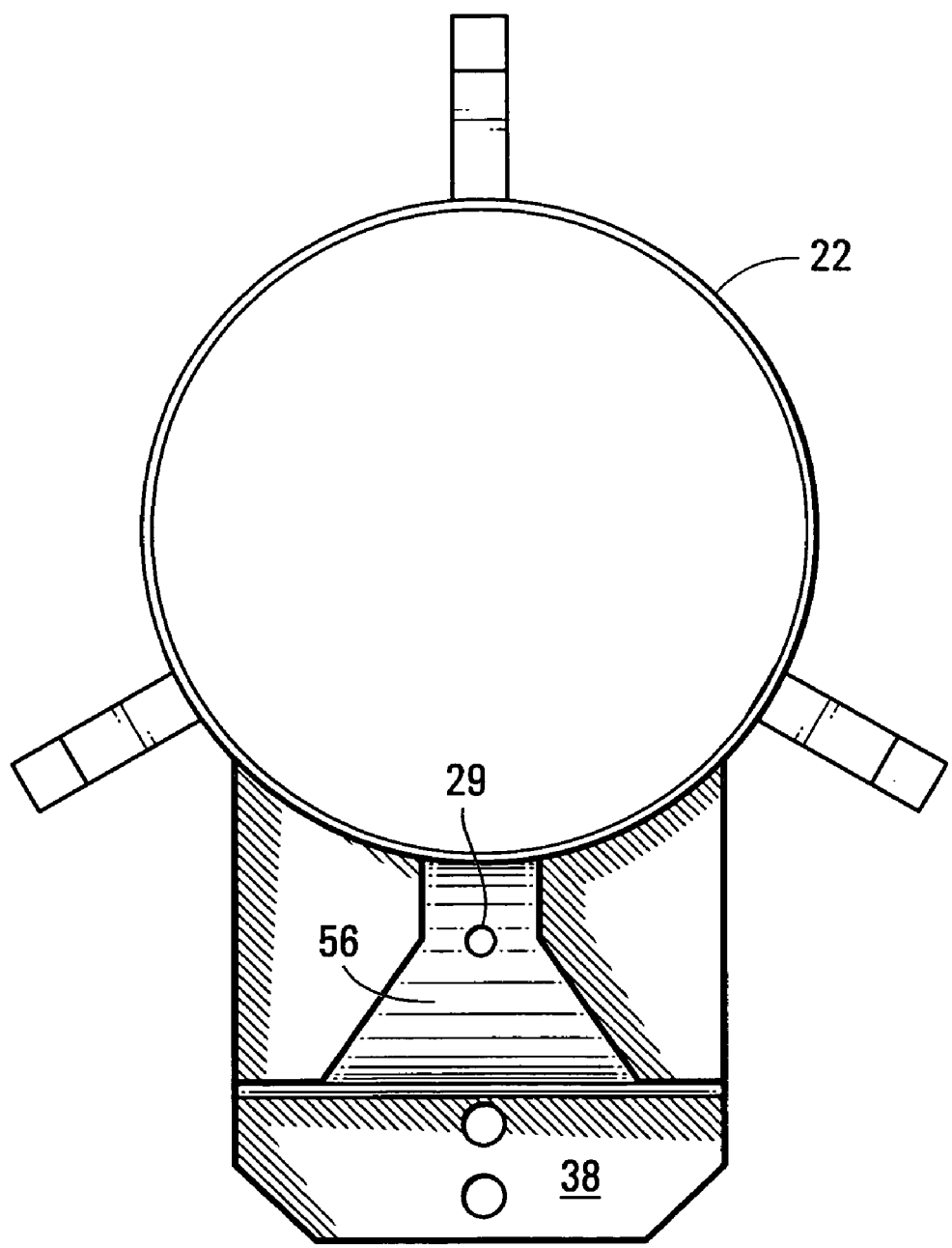
FIG. 5 shows a bottom plan view of the gas bubble generator of FIGS. 2, 3 and 4.

Shown in FIG. 5, is a bottom plan view of the gas bubble generator 24. As shown, the curved wall 56 of the passageway 47 can include a small hole 29 that facilitates the drainage of the gas bubble generator 24 in the case where the gas bubble generator 24 is removed from the tank 12 for cleaning. Such a hole 29 would not have any impact on the frequency regulation of the bubbles travelling through the bubble generator 24. As such, the continuous passageway 47 may include one or several small holes that can be plugged except for drainage purposes, so long as they do not obstruct, or in anyway affect the flow of gas/liquid through the passageway 47.

Due to the fact that the cross section of the second gas accumulation chamber 40 is larger than the cross section of the stand pipe 42, the curved wall 56 forms an asymmetrical return bend, wherein it is wider at its connection to the first wall 50 and narrower at its connection to the back wall 54. More specifically, and as shown in FIG. 5, the width of the curved wall 56 tapers as it extends from the first wall 50 towards the back wall 54. In this manner, the gas from the second gas accumulation chamber 40 is funnelled into the stand pipe 42.

The curved wall 56 can be a separate component from walls 50 and 54, such that it is connected to these two walls via mechanical connection methods. Alternatively, the curved wall 56 could be continuous with one or both of walls 50 and 54. In other words, these walls could all be made out of the same component material, and simply bent into the U-shape that the combination of walls 50, 56 and 54 create. In the case where walls 50, 56 and 54 are separate pieces, they can be connected together using any connection means known in the art, such as by welding, soldering, rivets, bolts, etc. . . . Likewise, the other walls of the housing 30 and of the interior chambers 38, 40 and 42 can also be connected together using such connection methods. All connection methods should create a water tight seal.

Referring back to FIG. 4, the gas supply line 25 enters the first gas accumulation chamber 38 through a gas inlet 46, such that gas is able to enter the gas bubble generator 24. In addition, the flushing line 27 enters the first gas accumulation chamber 38 through a flushing inlet 44, such that flushing fluid is also able to enter the gas bubble generator 24. The first gas accumulation chamber 38 further includes an opening 48 that is open to the body of liquid 14 contained in the tank 12. In the embodiment shown, the opening 48 is positioned at the opposite end of the first gas accumulation chamber 38 from the gas inlet 46 and the flushing inlet 44. In this manner, as gas enters the first gas accumulation chamber 38 through the gas supply line 25, any fluid contained in the first gas accumulation chamber 38 is pushed out through the opening 48.

In addition, as gas enters through gas inlet 46, the gas accumulates in both chambers 38 and 40. Since chambers 38, 40 and 42 are interconnected, the gas introduced into chambers 38 and 40 displaces liquid via both opening 48 and the gas outlet 58 in the stand pipe 42.

The gas outlet 58 in the stand pipe 42 is the opening through which gas bubbles from the gas bubble generator 24 are released into the stackpipe 22. These gas bubbles flow from the gas outlet 58 into the opening 80 in the stackpipe 22. The process of generating these bubbles will now be described in more detail.

During operation, the bubble generator 24 receives a continuous flow of digester bio-gas or other gases depending on the municipal or industrial application, from the gas supply line 25. In a non-limiting example, the bio gas may include a combination of $CO_2$ (30-40%) and Methane (70-60%). Other gases can include air, inert gases such as nitrogen, or natural gas where process conditions require it. In the embodiment shown, the gas enters the first gas accumulation chamber 38 via the gas supply line 25 that enters through the gas inlet 46. As the gas enters the gas bubble generator 24, it begins to fill both the first gas accumulation chamber 38 and the second gas accumulation chamber 40. As mentioned above, while this is happening, any of the liquid that was previously contained in these two accumulation chambers 38 and 40 is pushed out through opening 48 in the first gas accumulation chamber 38 and through the gas outlet 58 in the stack pipe 42. Once a sufficient amount of gas has accumulated within the first and second gas accumulation chambers 38 and 40, meaning that the gas level has reached the bottom edge 60 of the second wall 52, the gas in the two accumulation chambers 38 and 40 automatically slips into the stand pipe 42 through the passageway 47. A natural siphoning action takes place, diverting most of the accumulated gas in chambers 38 and 40 into the stand pipe 42. This gas then travels through the stand pipe 42 and is released into the stackpipe 22 through gas outlet 58. At this stage, the gas from the gas supply line 25 once again begins to fill the first and second gas accumulation chambers 38 and 40, and the cycle is repeated.

Figure 6:
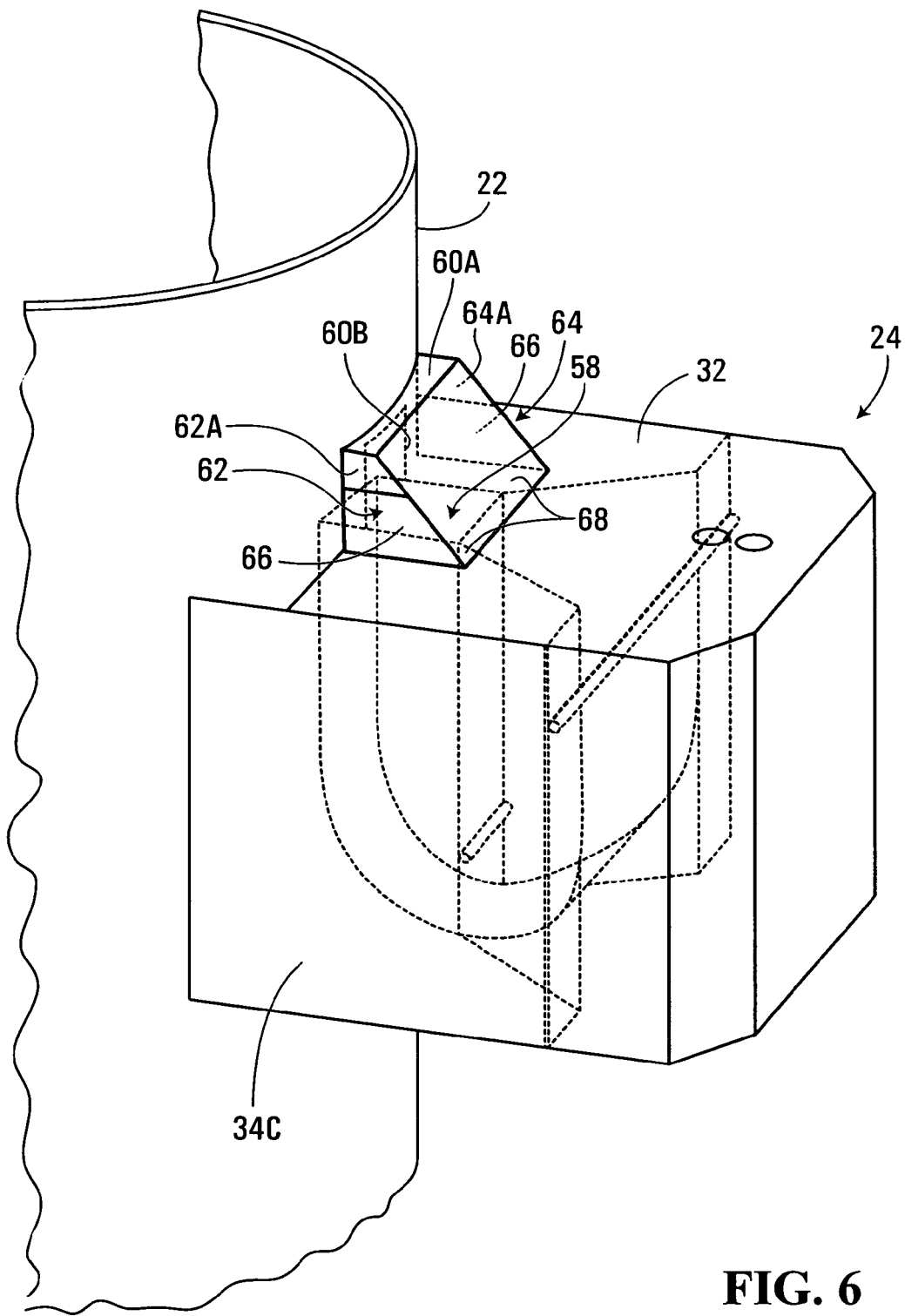
FIG. 6 shows a front perspective view of the gas bubble generator of FIGS. 2, 3, 4 and 5.

As shown in FIG. 6, positioned above the housing 30 of the gas bubble generator 24 is a hydraulic braking hood 36. As such, the gas bubble generator includes hydraulic openings in proximity to the upper end of the stand pipe 42. Specifically, the hydraulic braking hood 36 is positioned over the gas outlet 58 of the stand pipe 42. In accordance with a non-limiting embodiment, the hood 36 has a width greater than that of the gas outlet 58. As such, the hydraulic braking hood 36 extends past the gas outlet 58 on either side. It should, however, be appreciated that the hood 36 may be of the same width as the gas outlet 58.

In the non-limiting embodiment shown in FIG. 6, the hydraulic braking hood 36 includes two front walls 60a and 60b, and two side edges 62 and 64. Each of the two side edges 62 and 64 includes a hydraulic opening 66 that is exposed to the body of liquid 14. These openings 66 create hydraulic braking for controlling the frequency of the gas bubbles that enter the stackpipe 22. In addition, these openings 66 prevent the bubbles produced by the gas bubble generator 24 from splitting into multiple bubbles as they enter the stackpipe 22. In the case where the hydraulic brake is not present, liquid movement in the stack pipe creates suction in the side opening 80, which would pull the liquid or gas from the gas bubble generator. Under normal operating conditions about 5% of the liquid flow enters the stack pipe via opening 80, while 95% of liquid is pulled in from the bottom opening 16.

In the non-limiting embodiment shown, only a portion of the side edges 62 and 64 are open to the body of liquid 14, such that the side edges 62 and 64 include wall portions 62a and 64a. As such, the openings 66 are not as big as the side edges 62 and 64. Alternatively, the entire side edges 62 and 64 of the hydraulic braking hood 36 could be open, such that the hydraulic openings 66 are of the same size as the side edges 62 and 64. In such a case, there would be no wall portions 62a and 64a. In the embodiment shown, the openings 66 are of a substantially truncated triangular shape, however, it should be appreciated that these openings 66 can be of any shape without departing from the spirit of the invention. For example, the openings could be of a trapezoidal, or circular shape.

As shown in FIG. 6, the front walls 60a and 60b of the hydraulic braking hood 36 connect between the stackpipe 22 and the top wall 32 of the housing 30. In addition, the hydraulic openings 66 are positioned in a substantially vertical orientation in relation to the bottom of the tank 12. During normal operation of the anaerobic digestion system, biosolids that are suspended in the waste sludge, tend to settle downwards due to gravity. Advantageously, having the hydraulic openings 66 positioned in a substantially vertical orientation avoids such bio-solid debris from falling into the hydraulic brake openings 66 as it settles. This helps to prevent unnecessary clogging of the gas bubble generator 24.

Positioned underneath the front walls 60a and 60b of the hydraulic braking hood 36 are bottom portions 68. Given that the width of the top walls 60a and 60b is greater than the width of the gas outlet 58, these bottom portions 68 are positioned underneath the front walls 60a and 60b on either side of the gas outlet 58. In the embodiment shown in FIG. 6, these bottom portions 68 are walls formed by portions of the top wall 32 of the housing 30. However, in an alternative embodiment (not shown in FIG. 6), these bottom portions 68 can be open to the liquid, such that they form hydraulic openings. In the case where the gas bubble generator 24 has a substantially rectangular housing 30, as shown in the embodiment of FIGS. 3, 5 and 6, these hydraulic openings would extend into the empty chambers 37.

Figure 7A:
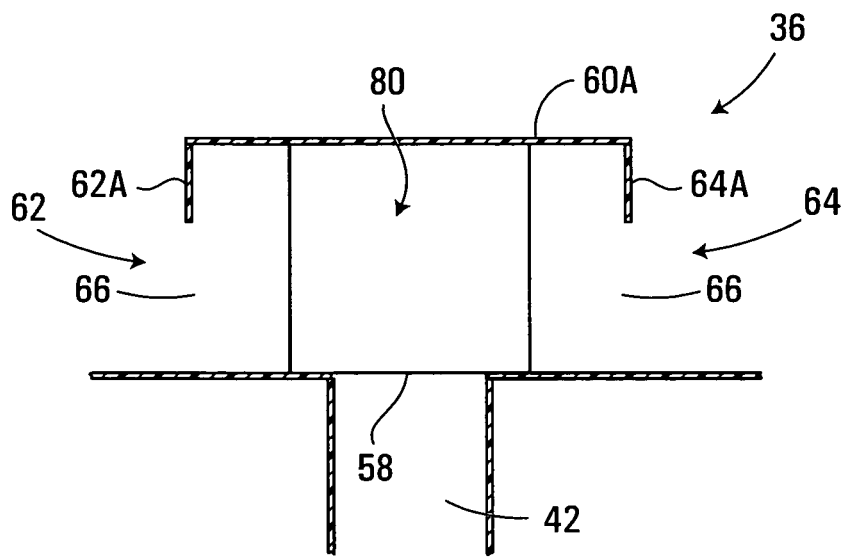
FIG. 7A-7C show schematic outlines of hydraulic braking hoods in accordance with non-limiting examples of implementation of the present invention.
Figure 7B:
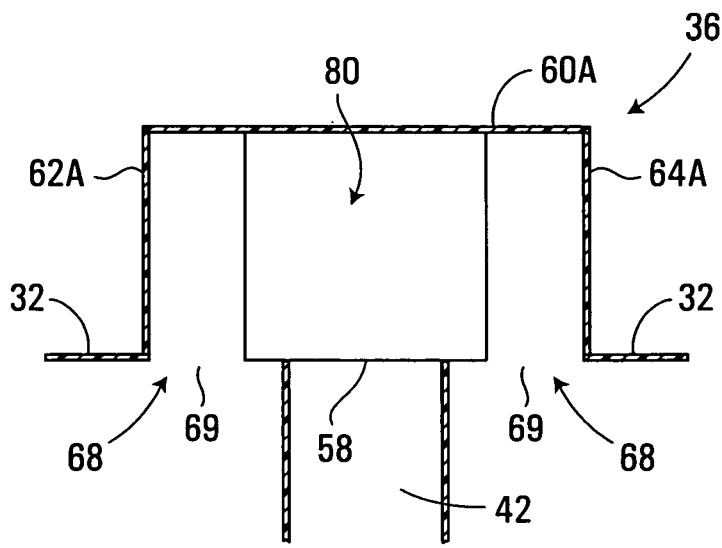
Figure 7C:
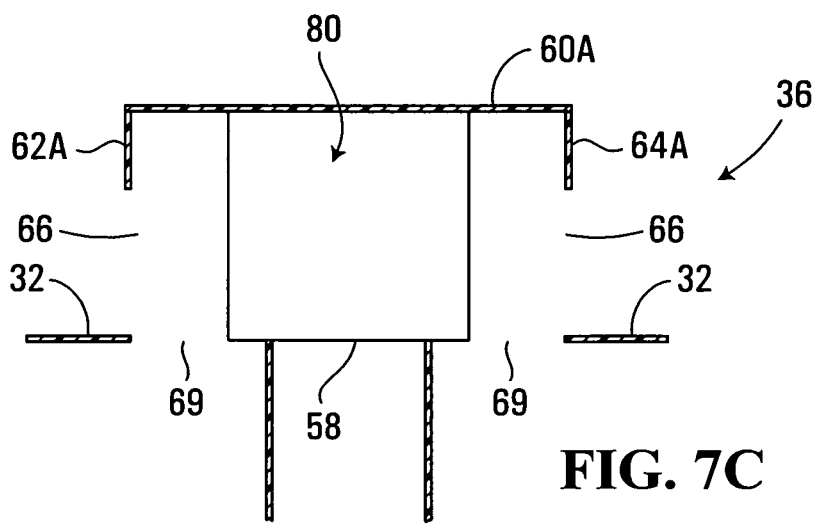

Shown in FIGS. 7A-7C are cross-sectional views of hydraulic braking hoods 36 that include different arrangements of hydraulic openings. For the purposes of these Figures, like parts are denoted with like numerals. Shown in FIG. 7A, is a cross sectional view of the hydraulic braking hood 36 shown in FIG. 6, wherein the hydraulic braking hood 36 includes only the hydraulic openings 66 at the side portions 62 and 64. Shown in FIG. 7B is a cross sectional view of a hydraulic braking hood that includes only hydraulic openings 69 that are positioned along the bottom portions 68. And finally, shown in FIG. 7C is a hydraulic braking hood that includes both hydraulic openings 66 at the side portions 62 and 64, and hydraulic openings 69 at the bottom portions 68.

Referring back to FIG. 4, the gas bubble generator 24 includes both a gas inlet 46, for receiving a continuous supply of gas from the gas supply line 25, and a flushing inlet 44 for receiving flushing fluid from the flushing line 27. Although two inlets are shown; namely the gas inlet 46 and the flushing inlet 44, in an alternative embodiment, the gas bubble generator 24 may include only one inlet, wherein both gas from the gas supply line 25 and flushing fluid from the flushing line 27 enter through this one inlet.

The gas supply line 25 may be operative to supply both gas, and flushing fluid to the gas bubble generator 24, such that if needed, there are two flushing lines for cleaning the gas bubble generator 24. During the course of normal operation, some of the bio-solids and other debris contained in the waste sludge accumulate within the chambers of the gas bubble generator 24. As such, it is advantageous to be able to flush out this debris without having to go through the expensive process of removing the bubble generator 24 from the tank 12.

In the non-limiting embodiment shown in FIG. 4, both the gas supply line 25 and the flushing line 27 are positioned over the first gas accumulation chamber 38. It should be appreciated that one or both of the gas supply line and the flushing line could also be positioned above the second gas accumulation chamber 40. In addition, the flushing line could also be positioned over the standpipe. At least one of the gas supply line 25 and the flushing line 27 is operative for injecting flushing fluid into the first gas accumulation chamber 38. In the non-limiting embodiment shown, it is the gas supply line 25 that is used to inject flushing fluid into the first gas accumulation chamber 38 for flushing any debris contained in that chamber out through opening 48.

In addition, at least one of the gas supply line 25 and the flushing line 27 is operative for injecting flushing fluid into the second gas accumulation chamber 40. In the non-limiting embodiment shown, it is the flushing line 27 that injects flushing fluid into the second gas accumulation chamber 40. More specifically, the flushing line 27 is positioned at an angle in relation to the first wall 50 such that it is able to inject flushing fluid into the second gas accumulation chamber 40 from its position over the first gas accumulation chamber 38. In addition, as the flushing fluid travels from the flushing line 27 to the second gas accumulation chamber 40, it is directed in proximity to the edge 61 of the wall 50. In operation, much of the debris that accumulates within the gas bubble generator 24, accumulates around the edge 61 of wall 50. As such, by directing the flushing fluid against and above this edge, the flushing fluid is able to dislodge and flush away any debris that has accumulated in this and other areas of the generator, including passages 40, 42, 47, 58 and 80.

As mentioned above, the passageway 47 that connects the second gas accumulation chamber 40 to the stand pipe 42 is a continuous passageway that provides a smooth transition between the two chambers. As such, the flushing fluid that is injected into the second gas accumulation chamber 40, is able to travel through the second gas accumulation chamber 40 into the stand pipe 42 and out through the gas outlet 58. In this manner, the debris that has accumulated within chambers 40 and 42, and passageway 47 is flushed out through the gas outlet 58.

Referring back to FIGS. 1 and 2, the gas bubble mixer 20 is supported via three legs 26, in a generally tri-pod arrangement. The three legs 26 are connected to the stackpipe 22, and are positioned around the circumference of the stackpipe 22 in a substantially equidistant relationship. The three legs 26 can be connected to the stackpipe 22 in any suitable way known in the art, such as by bolts, rivets, welding or flanges, for example. In the embodiment shown in FIGS. 1 and 2, the three legs 26 are operative for supporting the stackpipe 22 within the tank, and the stackpipe 22 is operative for supporting the gas bubble generator 24. The gas bubble generator 24 is mounted adjacent to the stackpipe 22, such that the majority of the gas bubble generator 24 is positioned exterior to the stackpipe 22. As such, the gas bubble generator 24 is not supported by any additional legs that are positioned between it and the floor of the tank 12.

The three supporting legs 26 extend outwardly from the stackpipe 22 such that they are positioned farther away from the liquid intake opening 16 than if they were abutted and extended straight down from the sides of the stackpipe 22. By extending away from the liquid intake opening 16, the legs 26 avoid blocking the liquid flow into the stackpipe 22, which helps to improve the overall performance of the mixer 10. In the non-limiting embodiment shown, the three legs 26 include two branches; namely branch 26a and branch 26b that are positioned at an angle in relation to each other. The branch 26a is connected to the stackpipe 22 and the branch 26b is connected to the base of the tank 12. The branch 26a is positioned at an angle in relation to the longitudinal axis of the stackpipe 22, for extending the legs 26 away from the liquid intake opening 16 of the stackpipe 22. It should be understood that legs 26 having any other configuration that allows them to extend away from the stackpipe 22, are also included within the scope of the present invention.

Although FIG. 1 depicts the tank 12 as having a substantially flat bottom, in most situations, the bottom surface of the tank forms a cone or a one-sided slanted slab, with drainage positioned in the lowest portion of the tank bottom. As such, the bottom surface of the tank is not flat, and instead slants downwards towards the lowest portion of the tank bottom. In light of this, in order to mount the standpipe 22 in the tank 12 such that it is positioned in a substantially vertical orientation, the three legs 26 that are used to mount the standpipe are not necessarily of the same length. Instead, their length may vary depending on the degree of slope of the bottom surface of the tank. In accordance with a non-limiting embodiment, the legs 26 may be adjustable in length, such that their length can be adjusted while the stack pipe 22 is being installed in the tank 12. For example, the legs 26 may include sliding components, or telescopic components that are able to be adjusted at the time of installation.

In general, the branches 26b of the legs 26 are attached to connection points (not shown) on the bottom surface of the tank via bolts. However, other connection mechanisms known in the art could also be used without departing from the spirit of the invention, for mounting the legs 26 to the surface of the tank 12.

In yet a further alternative arrangement, the legs 26 of the tri-pod support can be used to suspend the stackpipe 22 from the cover 11 of the tank. In such an arrangement, the legs 26 do not interfere with the intake opening 16 at the lower end of the stackpipe 22, thus providing greater free space at the intake opening 16. More specifically, this arrangement leaves the bottom of the stackpipe 22 free from any supports that could interfere with liquid/sludge flow into the stackpipe 22. With this "roof" mounted arrangement, it should be understood that a minimum of three legs 26 can be used to secure the stackpipe 22 to the cover 11.

Figure 8:
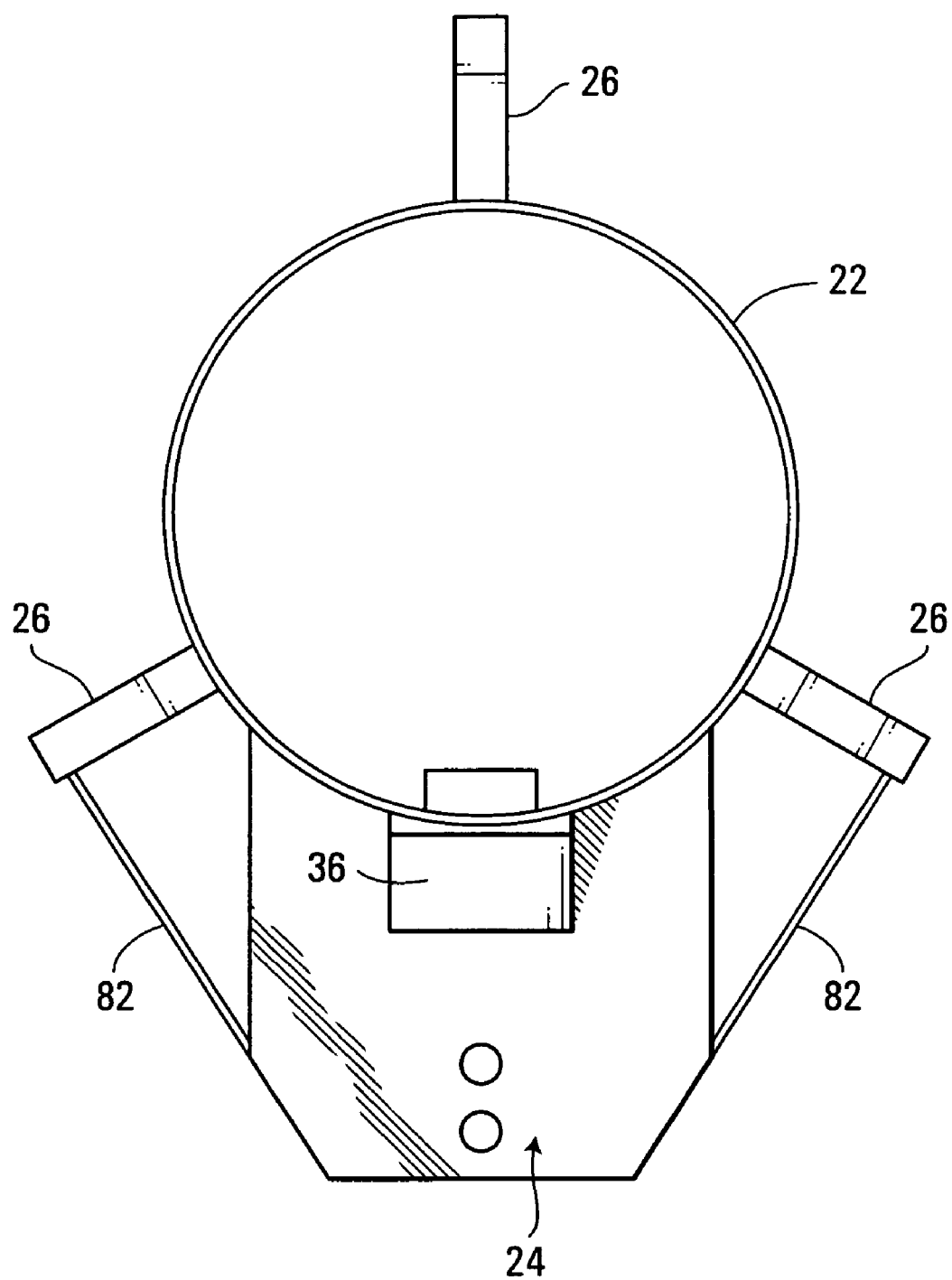
FIG. 8 shows the gas bubble generator of FIGS. 2-5 that is supported from two of the tripod legs.

Referring now to FIG. 2, in the non-limiting embodiment shown, the gas bubble generator 24 is mounted adjacent to the stackpipe 22 such that it is positioned between two of the legs 26. In such an embodiment, it is the stackpipe 22 that supports the gas bubble generator 24. It should, however, be appreciated that in an alternative embodiment, such as that shown in FIG. 8, the gas bubble generator 24 could also include supports 82 that attach to two of the legs 26 for providing additional support for the gas bubble generator 24. In such an embodiment, the bubble generator 24 is mounted to the stackpipe 22 supports.

Although the gas bubble generator 24 shown in FIGS. 1 through 8 includes a substantially rectangular housing 30, it should be understood that gas bubble generators having different shapes are included within the scope of the present invention.

Figure 9:
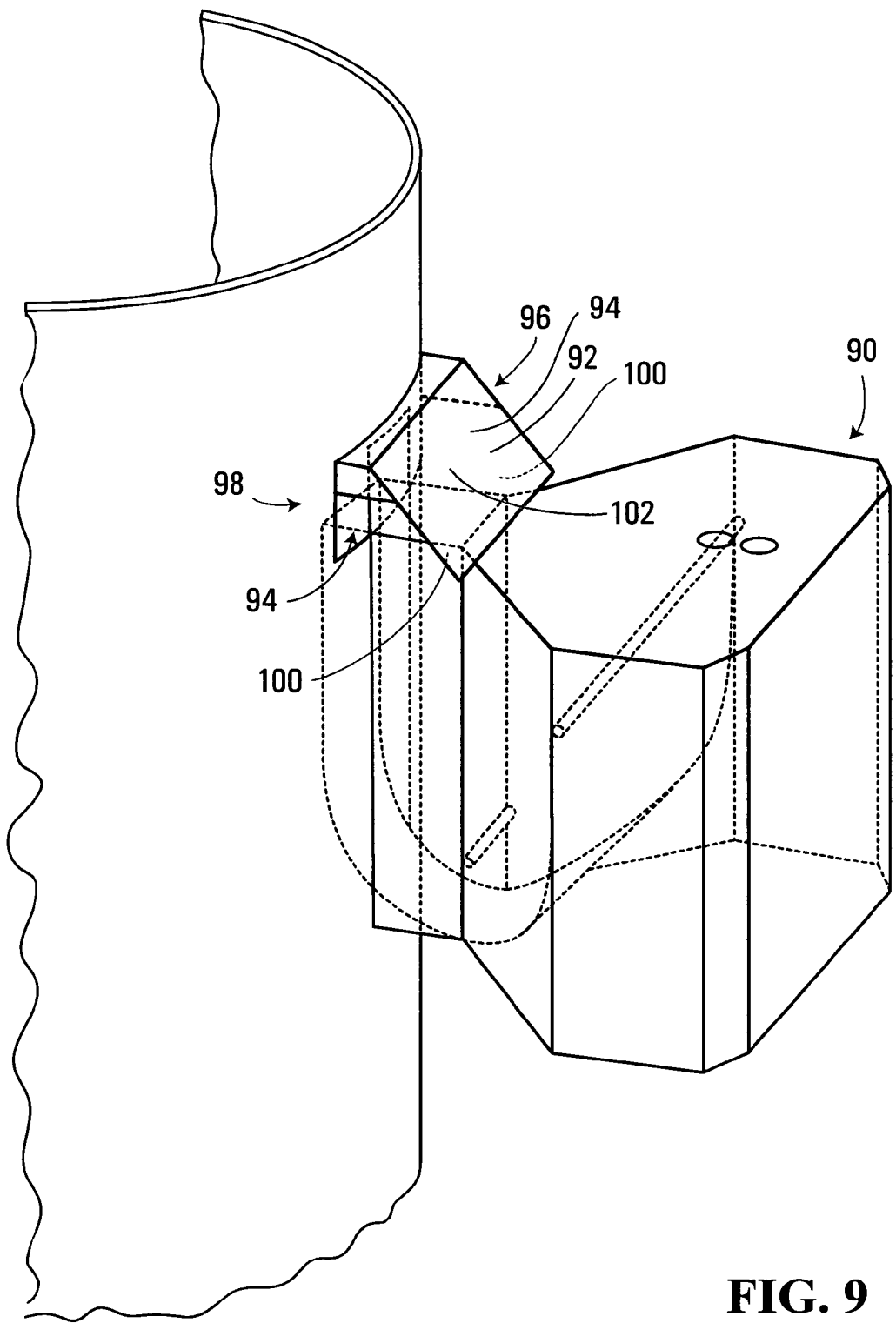
FIG. 9 shows a perspective view of a gas bubble generator in accordance with an alternative non-limiting embodiment of the present invention.

Shown in FIG. 9 is a gas bubble generator 90 in accordance with an alternative, non-limiting embodiment of the present invention. The gas bubble generator 90 does not include extra walls that define a housing surrounding the interior chambers. Instead, the gas generator 90 simply includes the walls that define the three interior chambers.

Gas bubble generator 90 includes a hydraulic braking hood 92 that includes hydraulic openings 94 along its two side portions, 96 and 98, and hydraulic openings 100 underneath the front walls 102. Given that the gas bubble generator 90 does not include any empty chambers, the hydraulic openings 100 are open to the liquid in the tank 12.

Figure 10:
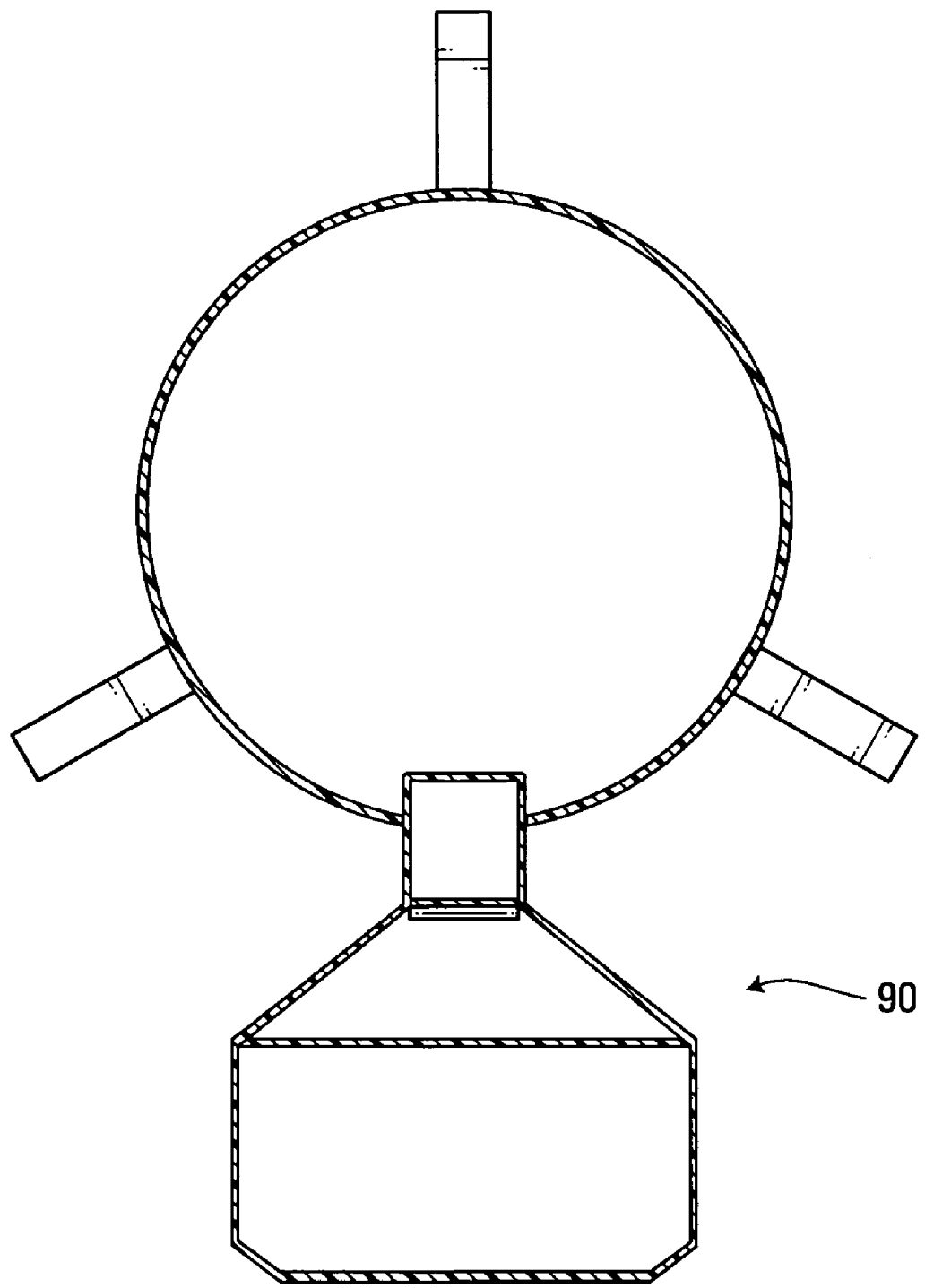
FIG. 10 shows top plan view of the gas bubble generator of FIG. 9.

FIG. 10 shows a cross sectional view of the gas bubble generator 90 shown in FIG. 9.

Figure 11:
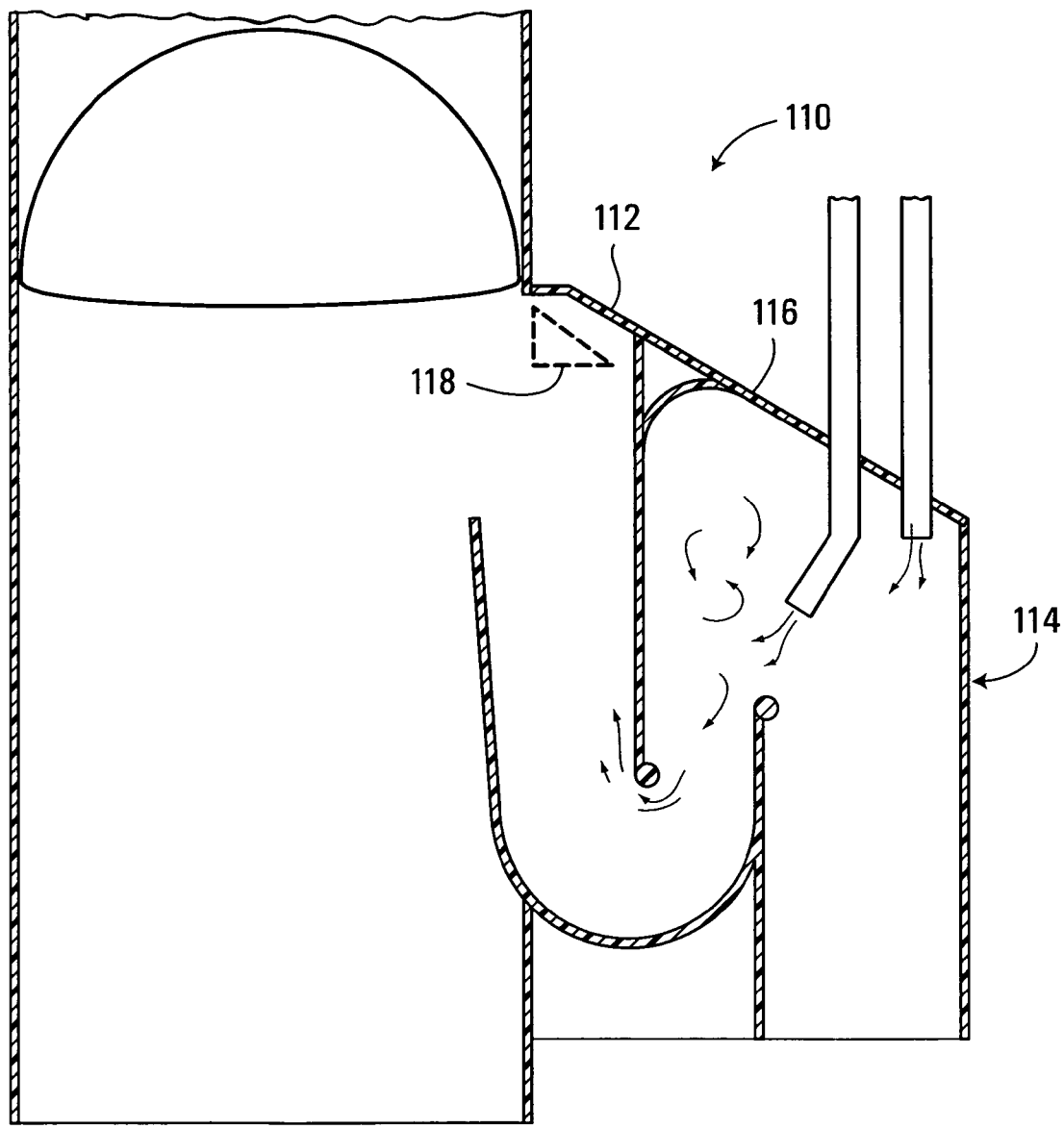
FIG. 11 shows a perspective view of a gas bubble generator in accordance with yet another alternative non-limiting embodiment of the present invention.

Shown in FIG. 11 is a gas bubble generator 110 in accordance with yet another alternative, non-limiting embodiment of the present invention. The gas bubble generator 110 includes a housing 114 that has a top wall 116 and side walls (not shown). In this embodiment, the hydraulic braking hood 112 is integrally formed with the housing 114, such that the front wall of the hydraulic braking hood 112 is also the top wall 116 of the housing 114. In this embodiment, the hydraulic braking hood 112, includes hydraulic openings 118 positioned on its side edges.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A gas bubble generator suitable for being submerged within a body of liquid and for being positioned adjacent to a stackpipe, said gas bubble generator comprising:
    a first gas accumulation chamber;
    a second gas accumulation chamber in communication with said first gas accumulation chamber;
    a stand pipe having a lower end in communication with said second gas accumulation chamber and an upper end having a gas exit through which gas exits said bubble generator;
    a continuous passageway between said second gas accumulation chamber and said stand pipe through which gas travels from said first and second gas accumulation chambers to said upper end of said stand pipe, said continuous passageway comprising a wall that extends between a wall of said second gas accumulation chamber and a wall of said stand pipe;
    a hydraulic braking opening located in proximity to said upper end of said stand pipe.

2. A gas bubble generator as defined in claim 1, wherein said first gas accumulation chamber has a first cross sectional area, said second gas accumulation chamber has a second cross sectional area and said stand pipe has a third cross sectional area, said first cross sectional area being greater than said second cross sectional area and said second cross sectional area being greater than said third cross sectional area.

3. A gas bubble generator as defined in claim 1, wherein said second gas accumulation chamber has a first end and a second end, said first end being in communication with said first gas accumulation chamber, and said second end being in communication with said stand pipe.

4. A gas bubble generator as defined in claim 1, wherein said first gas accumulation chamber includes a gas inlet, and an opening to the body of liquid.

5. A gas bubble generator as defined in claim 1, wherein the stackpipe defines a tubular passage through which gas bubbles can travel, at least a portion of said stand pipe being positioned within the tubular passage of the stackpipe.

6. A gas bubble generator as defined in claim 5, wherein said stand pipe comprises a back wall, at least a portion of said back wall being positioned within the tubular passage of the stack pipe.

7. A gas bubble generator as defined in claim 6, wherein said stand pipe is of a generally rectangular cross section.

8. A gas bubble generator as defined in claim 6, wherein the stackpipe has a longitudinal axis, said back wall being positioned within said tubular passage at an angle in relation to the longitudinal axis of the stackpipe.

9. A gas bubble generator as defined in claim 1, further comprising a hydraulic braking hood comprising a front side and two side edges, said hydraulic braking hood covering said gas exit of said stand pipe, and including openings in said side edges.

10. A gas bubble generator as defined in claim 9, wherein said gas bubble generator comprises a housing having a top wall and at least one side wall, said housing containing therein:
    said first gas accumulation chamber;
    said second gas accumulation chamber; and
    said stand pipe;
    said hydraulic braking hood being positioned above said gas exit, such that said front side is connected between the stackpipe and said top wall of said housing.

11. A gas bubble generator as defined in claim 10, wherein said at least one front wall has a width that is approximately twice the width of said gas exit of said stack pipe.

12. A gas bubble generator as defined in claim 9, wherein said openings in said side edges are substantially triangular in shape.

13. A gas bubble generator as defined in claim 9, wherein said openings in said side edges are positioned in a substantially vertical orientation.

14. A gas bubble generator as defined in claim 1, wherein said wall that extends between a wall of said second gas accumulation chamber and a wall of said stand pipe is a continuous curved wall.

15. A gas bubble generator as defined in claim 14, wherein said continuous curved wall forms an asymmetrical return bend.

16. A gas bubble generator as defined in claim 14, further comprising a drainage hole in said continuous curved wall.

17. A gas bubble generator as defined in claim 14, wherein said first gas accumulation chamber and said second gas accumulation chamber are separated by a first wall, and wherein said second gas accumulation chamber and said stand pipe are separated by a second wall, said continuous curved wall extending from said first wall, to a back wall of said stand pipe.

18. A gas bubble generator as defined in claim 17, further comprising a flushing inlet for directing flushing fluid into at least one of said first gas accumulation chamber, said second gas accumulation chamber and said stand pipe.

19. A gas bubble generator as defined in claim 18, wherein said flushing inlet is positioned above one of said first gas accumulation chamber and said standpipe.

20. A gas bubble generator as defined in claim 18, wherein said flushing inlet receives a flushing line that is positioned at an angle in relation to said first wall.

21. A gas bubble generator as defined in claim 20, wherein said flushing line is operative for directing flushing fluid in proximity to an edge portion of said first wall.

22. A gas bubble generator as defined in claim 18, wherein said flushing line is operative for directing flushing fluid into one of said second gas accumulation chamber and said stand pipe, said continuous passageway permitting the flushing fluid directed into one of said second gas accumulation chamber and said stand pipe to flow into the other one of said second gas accumulation chamber and said stand pipe.

23. A gas bubble generator suitable for being positioned adjacent to a stackpipe and submerged within a body of liquid, said gas bubble generator comprising:
    a first gas accumulation chamber;
    a second gas accumulation chamber, wherein said first gas accumulation chamber and said second gas accumulation chamber are separated by a first wall;
    a standpipe, wherein said second gas accumulation chamber and said standpipe are separated by a second wall;
    a flushing inlet through which flushing fluid enters said gas bubble generator, said flushing inlet being positioned above at least one of said first gas accumulation chamber and said standpipe, wherein flushing fluid that enters through said flushing inlet travels through said second gas accumulation chamber and said standpipe.

24. A gas bubble generator as defined in claim 23, wherein said flushing inlet receives a flushing line that is positioned at an angle in relation to said first wall.

25. A gas bubble generator as defined in claim 24, wherein said flushing line is operative for directing flushing fluid in proximity to an edge portion of said first wall.

26. A gas bubble generator as defined in claim 23, further comprising a continuous passageway between said second gas accumulation chamber and said stand pipe, said continuous passageway being absent a hydraulic braking orifice, said flushing line being operative for directing flushing fluid into said second gas accumulation chamber such that said flushing fluid passes through said continuous passageway for flushing out both said second gas accumulation chamber and said stand pipe.

27. A gas bubble generator suitable for being submerged within a body of liquid and for being positioned adjacent to a stackpipe, the stackpipe having an upper discharge opening, a lower inlet opening and a tubular passage through which gas bubbles can travel, said gas bubble generator comprising:
    a first gas accumulation chamber;
    a second gas accumulation chamber; and
    a stand pipe, said stand pipe comprising a back wall, wherein at least a portion of said back wall is positioned within the tubular passage of the stack pipe.

28. A gas bubble generator as defined in claim 27, further comprising a continuous passageway between said second gas accumulation chamber and said stand pipe, said continuous passageway being absent a hydraulic braking orifice.

29. A gas bubble generator suitable for being submerged within a body of liquid and for being positioned adjacent to a stackpipe, said gas bubble generator comprising:
    a housing having a top wall and at least one side wall, said housing containing therein:
    i) a first gas accumulation chamber;
    ii) a second gas accumulation chamber;
    iii) a stand pipe, said stand pipe comprising a gas outlet through which gas exits said gas bubble generator;
    a hydraulic braking hood positioned above said gas outlet, said hydraulic braking hood comprising:
    i) a front wall connected between the stackpipe and said top wall of said housing;
    ii) two side edges; and
    iii) at least one bottom portion, wherein at least one of said side edges and said at least one bottom portion are open to the body of liquid.

30. A gas bubble generator as defined in claim 29, wherein at least a portion of said two side edges are open to the body of liquid for defining side openings in said hydraulic braking hood.

31. A gas bubble generator as defined in claim 29, wherein said at least one front wall has a width that is approximately twice the width of said gas outlet of said stack pipe.

32. A gas bubble generator as defined in claim 30, wherein said openings in said side edges are substantially triangular in shape.

33. A gas bubble generator as defined in claim 30, wherein said openings in said side edges are positioned in a substantially vertical orientation.

34. A gas bubble generator as defined in claim 29, further comprising a continuous passageway between said second gas accumulation chamber and said stand pipe, said continuous passageway being absent a hydraulic braking orifice.

35. A gas bubble generator suitable for being submerged within a body of liquid and for being positioned adjacent to a stackpipe, said gas bubble generator comprising:
    a first gas accumulation chamber;
    a second gas accumulation chamber in communication with said first gas accumulation chamber;
    a stand pipe having a lower end in communication with said second gas accumulation chamber and an upper end having an exit through which gas exits said bubble generator;
    a continuous passageway between said second gas accumulation chamber and said stand pipe through which gas travels from said first and second gas accumulation chambers to said upper end of said stand pipe, said continuous passageway being absent a hydraulic braking opening;
    a hydraulic braking opening located in proximity to said upper end of said stand pipe.

36. A gas bubble generator suitable for being submerged within a body of liquid and for being positioned adjacent to a stackpipe, said gas bubble generator comprising:
    a first gas accumulation chamber having a first cross sectional area;
    a second gas accumulation chamber in communication with said first gas accumulation chamber, said second gas accumulation chamber having a second cross sectional area;
    a stand pipe having a lower end in communication with said second gas accumulation chamber and an upper end having a gas exit through which gas exits said bubble generator, said stand pipe having a third cross sectional area, said first cross sectional area being greater than said second cross sectional area and said second cross sectional area being greater than said third cross sectional area;

a continuous passageway between said second gas accumulation chamber and said stand pipe through which gas travels from said first and second gas accumulation chambers to said upper end of said stand pipe, said continuous passageway comprising a wall that extends between a wall of said second gas accumulation chamber and a wall of said stand pipe;

a hydraulic braking opening located in proximity to said upper end of said stand pipe.

\* \* \* \* \*